April 10, 1962

H. D. F. PETERS 3,028,783

DEVICE FOR TESTING THE DENSITY OF
COATINGS ON SUPPORT BODIES

Filed Sept. 24, 1956

INVENTOR.
Homer D. F. Peters
BY
Nobbe & Swope
ATTORNEYS

April 10, 1962  H. D. F. PETERS  3,028,783
DEVICE FOR TESTING THE DENSITY OF
COATINGS ON SUPPORT BODIES
Filed Sept. 24, 1956  4 Sheets-Sheet 2
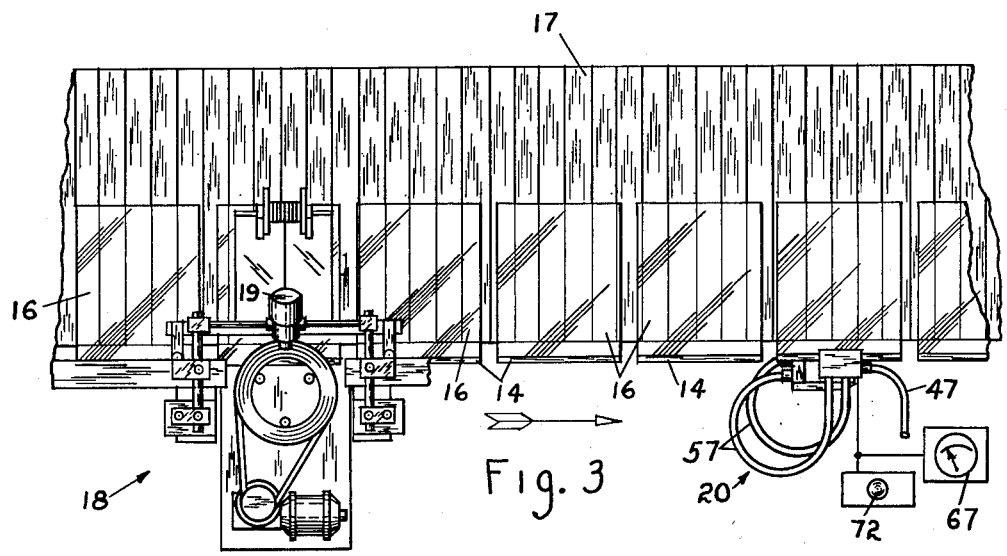
Fig. 3
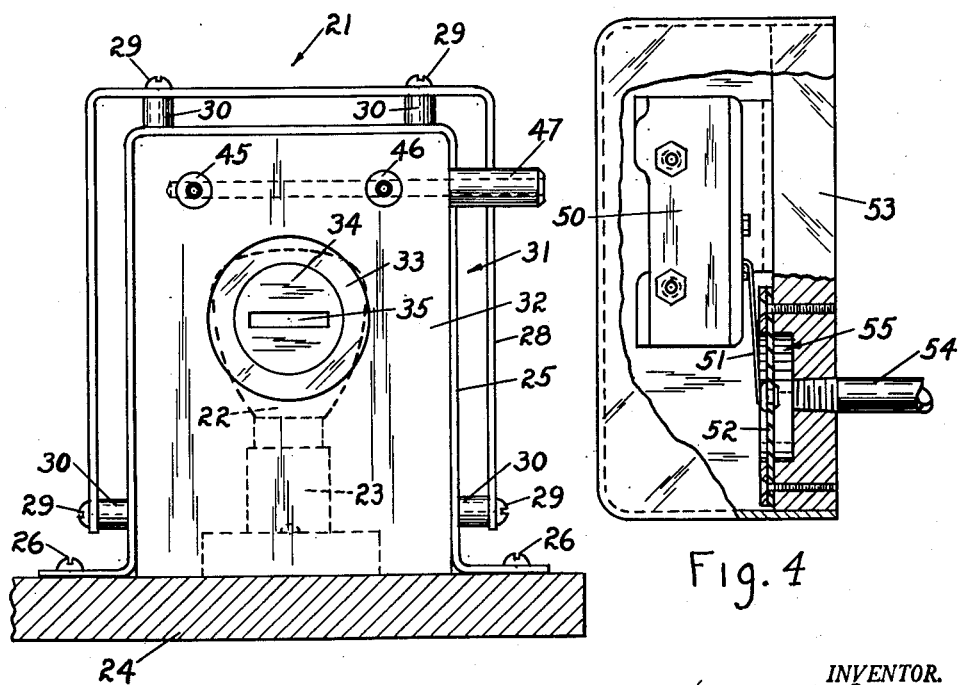
Fig. 4
Fig. 5
INVENTOR.
Homer D. F. Peters
BY
Nobbe & Swope
ATTORNEYS April 10, 1962

H. D. F. PETERS 3,028,783

DEVICE FOR TESTING THE DENSITY OF
COATINGS ON SUPPORT BODIES

Filed Sept. 24, 1956

INVENTOR.
Homer D. F. Peters
BY
Nobbe & Swope
ATTORNEYS

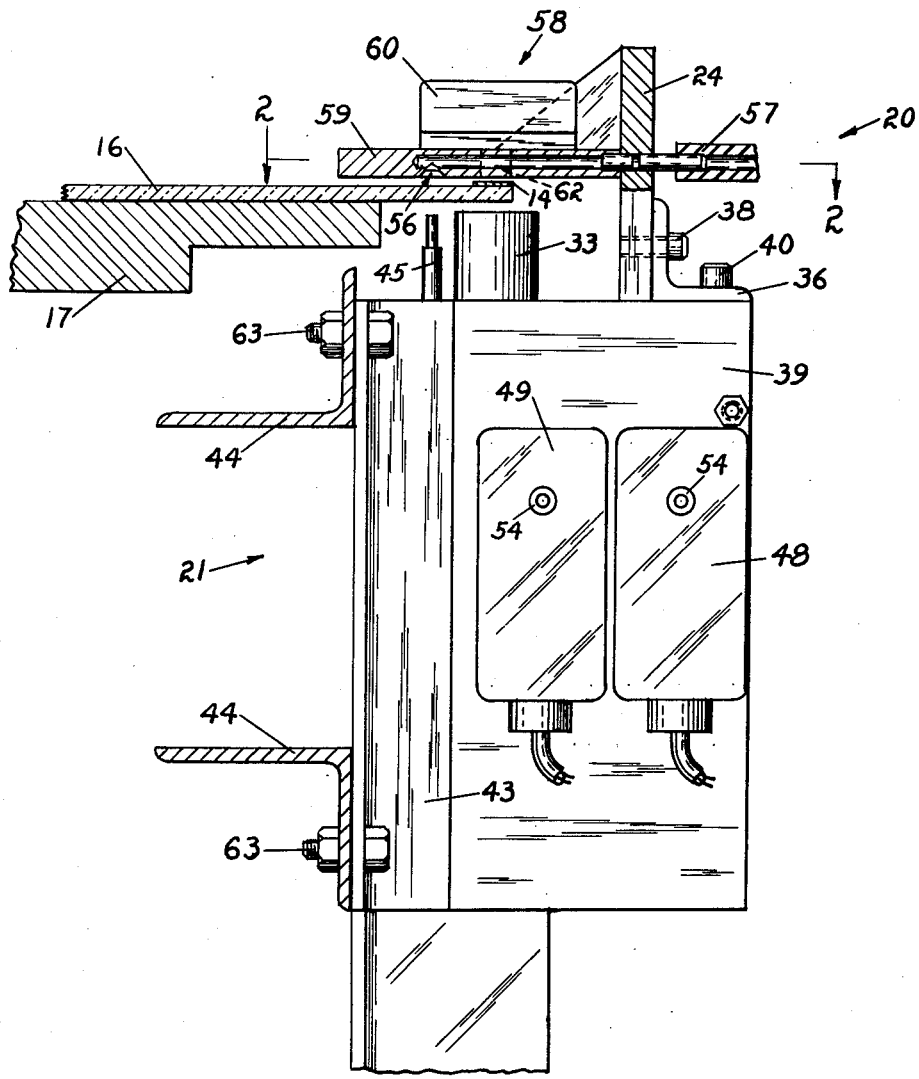

United States Patent Office 3,028,783
Patented Apr. 10, 1962

3,028,783
DEVICE FOR TESTING THE DENSITY OF COATINGS ON SUPPORT BODIES
Homer D. F. Peters, Toledo, Ohio, assignor to Libbey-Owens-Ford Glass Company, Toledo, Ohio, a corporation of Ohio
Filed Sept. 24, 1956, Ser. No. 611,462
8 Claims. (Cl. 88—14)

This invention pertains broadly to multiple sheet glazing units and more particularly to a method and apparatus for determining the density of a metallized coating on sheets of such units.

Essentially we are concerned with what is termed a multiple sheet glazing unit in which glass sheets are held in a spaced relation by a metal separator in a manner so provided as to create an air and moisture proof space or spaces between the glass sheets, thus giving a permanent and satisfactory structure for the reduction of heat transfer and assisting in prevention of condensation of moisture on the glass sheets. As a preliminary step in providing suitable bond of the metal separator and the glass sheets a metallized coat is provided on said glass sheets. A method of producing this metallized coating, although not the only one, is to spray the glass sheet over a predetermined area with a metallizing gun. After the metallized coating has been applied to the glass sheet a thin layer of solder, or other suitable metal, is then applied to the metallized area. After the preliminary preparation of the glass, the separator is then soldered or sweated on the above treated area, thus providing a suitable bond between a metal separator and the glass sheets.

It has been found from previous tests that the density of the metallized coating on the glass sheets is an important factor in producing a bond of sufficient strength between a separator and a glass sheet. If the metallized coating is insufficiently dense, there will be too little of a metallized surface for the solder, or other suitable bonding metal, to adhere to. On the other hand, if the metallized coating is too dense it has been found that it will not bond well, or adhere to the glass sheet upon which it has been applied, and later would possibly form blisters. Because of the critical nature of the density of the metallized coating, it is desirable to provide a method for the measuring of this density in order to be able to realize when the metallized coating has been applied unsatisfactorily and thus to be able to change the fabrication procedure to correct the condition.

The primary object of this invention is to provide a method and apparatus for the determination of the density of a metallized coating on a sheet.

Another object of this invention is to provide a visual signaling device which will be actuated whenever the metallized coating on the multiple sheet glazing unit has an unsatisfactory density.

Still another object of the invention is to provide an inspection apparatus for the direct reading of the density of a metallized coating on a sheet while the sheet is being provided with a continuous motion in regard to the inspection apparatus.

In the drawings wherein like numerals are employed to designate like parts throughout the same:

FIG. 3 is a plan view containing the apparatus for the application of the metallized coating and also the apparatus for testing the density of said metallized coating;

FIG. 4 is a side elevation partly in section of an air actuated switch used for making circuit connections when sheet is in proper testing position;

FIG. 5 is a plan view of a housing containing a light source and air nozzles which are located on the lower part of the testing apparatus;

FIG. 8 is an elevation view of the inspection station and a glass sheet in the process of being tested.

Figure 2:
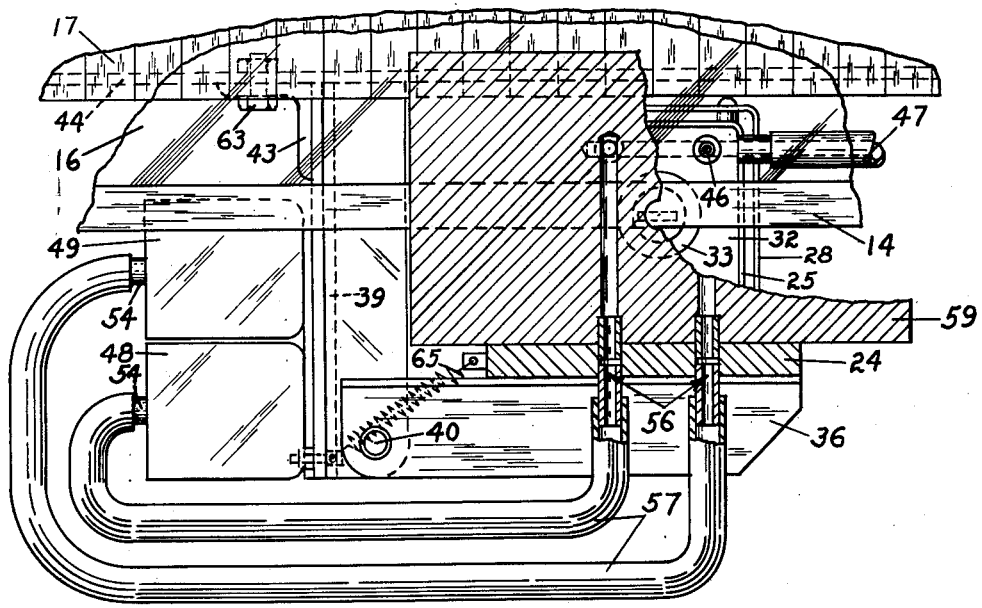
FIG. 2 is a sectional plan view of the inspection apparatus taken along line 2—2 of FIG. 8.
Figure 1:
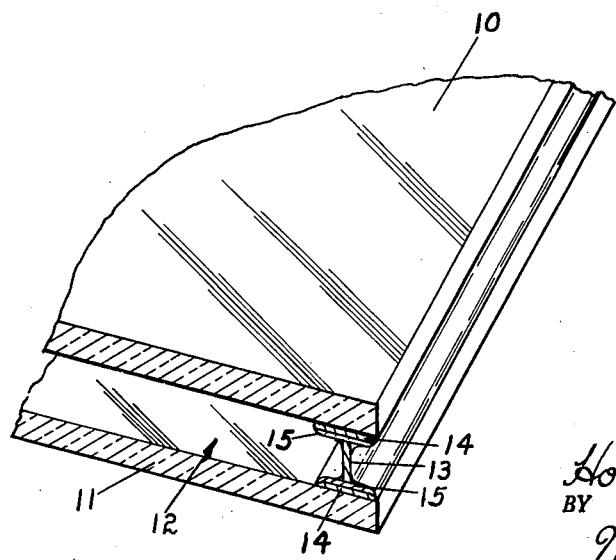
FIG. 1 is a fragmentary perspective view of a multiple sheet glazing unit with which the present invention is concerned.

With reference particularly to FIG. 1, there is disclosed a glazing unit consisting of two sheets of glass 10 and 11, arranged in a spaced condition to provide an air space 12 therebetween. This air space is formed by the use of metal separator strip 13 joined to the glass sheets through the intermediaries of a metallic coating 14 and a solder layer 15. The sealing completely around the edges of two sheets of glass such as shown here will serve to produce a multiple sheet glazing unit.

Although the glazing unit as discussed and illustrated herein is described as a two-sheet unit, it is to be understood that there is no intention to confine a unit to any particular number of sheets used or spacing between the sheets.

Since the inner faces of the glass sheets can not be cleaned after a glazing unit has been fabricated and installed, it is desirable to use glass which is stable in use. Also before completion of fabrication, the inner faces of the glass sheets should be thoroughly cleaned not only for the sake of appearance but to facilitate the application of the metallic coating on the glass in order to obtain a permanent adherence or bond between the glass and metal.

In FIG. 3 there are shown a series of glass sheets 16 being moved, in a direction indicated by the arrow, by a slat type conveyor system 17. The apparatus 18 in FIG. 3 is provided for the production of a metallized coating 14 on the edge of the glass sheets 16. This metallized coating is produced by the spraying of copper onto the glass sheet from a metallizing gun 19. Copper is the preferred metal for a metallized coating since it was found that it can be sprayed on glass satisfactorily and also weathers well in use. As stated before, there is no doubt that other metals or metallic alloys or multiple coats of different metals, can be substituted for copper.

To determine the density of the metallized coating 14, there is provided a test apparatus 20, which consists of two main parts, one which is positioned above a glass sheet to be tested and the other which is positioned below the same test sheet. The part which has the lower position, shown generally by number 21 (FIG. 6), consists of a light source 22 mounted in a socket 23, said socket being affixed to a vertical wall member 24. The light source 22 is enclosed by housing 25 affixed to wall 24 by screws 26, said housing being provided with numerous holes 27 for the advent of cooling air to light source 22. Another housing 28 is situated around housing 25 (FIGS. 5 and 6), affixed to housing 25 by screws 29, and suitably spaced from housing 25 by spacers 30, this outer housing being provided to prevent the escape of annoying rays or "stringers" of light and also still providing an access path 31 for cooling air to get to light source 22.

The upward end or top of the light source housing 25 (FIG. 6) has a metal cover 32 through which is projected upwardly a hollow cylinder 33 which contains a slotted diaphragm 34 (FIG. 5), at the uppermost end of the cylinder and lens 35 placed just below the diaphragm. The mounting wall 24 is secured to angle irons 36 and 37 by means of screws 38. Angle irons 36 and 37 are secured to side mounting wall 39 by means of bolts 40 and angle irons 41 and 42 which are welded to plate 39. Along the side mounting wall 39 at a position closest to the conveyor and affixed to said wall is angle iron 43 (FIGS. 6 and 8) which is also mounted onto angle irons 44 of the conveyor frame assembly (not shown). Two compressed air nozzles 45 and 46 positioned one on each side of cylinder 33 (FIG. 6) in such a manner that one of them will intercept a glass sheet 16 to be tested before the glass sheet reaches said cylinder entrance nozzle 45, and the other will intercept the sheet after it has passed over said cylinder exit nozzle 46. The nozzles 45 and 46 are also positioned nearer to conveyor 44 than the cylinder 33, as shown in FIG. 8, and with the top edge, or orifice end, of the nozzles slightly lower than the top of the diaphragm 34 of cylinder 33. Both nozzles 45 and 46 are supplied with compressed air by tube 47 from air pump (not shown).

Figure 6:
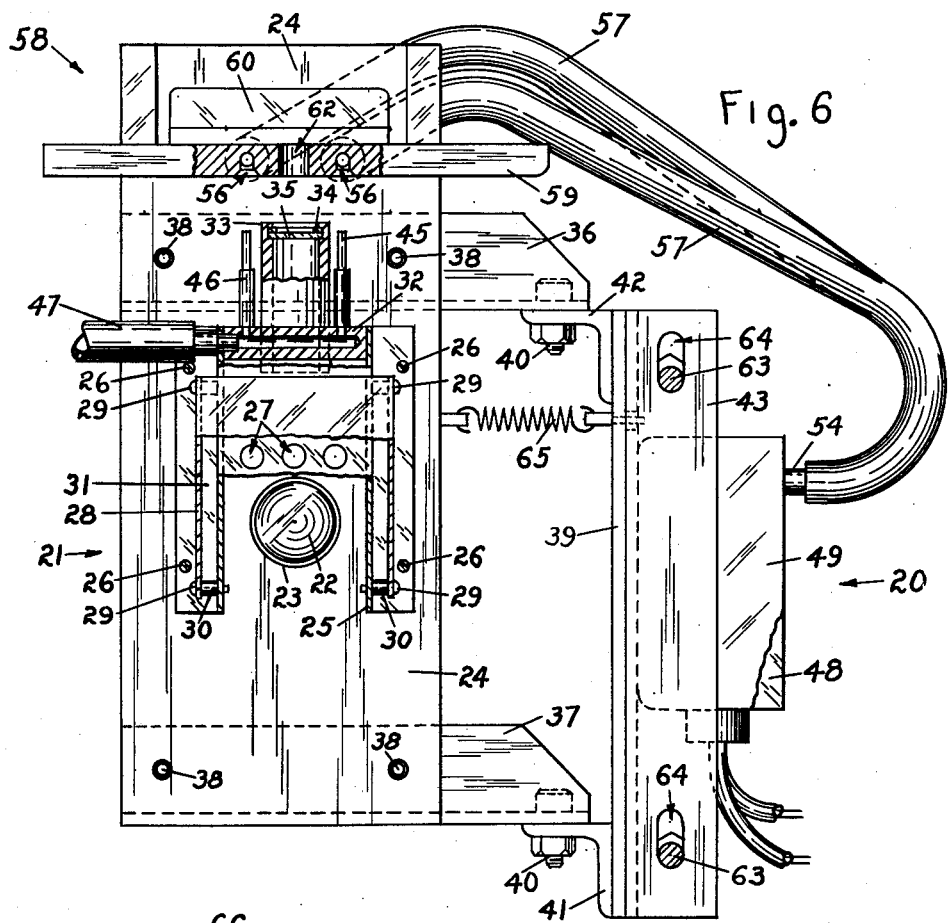
FIG. 6 is a front elevation view of the light source, air nozzles and probe unit.

On the wall 39 are mounted two air switches 48 and 49 (FIGS. 6 and 8). These air switches (FIG. 4) consist essentially of a microswitch 50 mounted with its actuating arm 51 in contact with, or affixed to, a diaphragm 52 which has been secured to the support plate 53 containing circular chambers providing an air tight cover for the space enclosed, so that when compressed air is supplied through tube 54 into the enclosed chamber 55 the consequent distending or bowing outwardly of diaphragm 52 will operate switch 50 through the instrumentality of its actuating arm 52. Or as particularly shown herein (FIG. 6), compressed air enters into supply tube 47, from there into nozzles 45 and 46, and on issuing from the nozzles enters receiving tubes 56, follows along tubes 57 into entrance tube 54 (FIG. 4), and finally actuates switch 50 which energizes control circuits that will be discussed in greater detail later.

The upper portion of the test apparatus indicated by 58 is mounted on a supporting wall 59 which is suitably secured to vertical mounting wall 24 and extends therefrom in an approximately horizontal position (FIGS. 6 and 8). Mounted on wall 59 is probe unit 60, which consists of photocell 61 in a metallic enclosure. An access hole has been provided therein, said access hole so made that light entering hole will impinge on the appropriate part of photocell 61. This probe unit 61 is so mounted on wall 59 that the access hole of the probe is directly over a similar shaped access hole 62 in wall 59, the center line of hole 62 has been collimated with the center line of cylinder 33, and thus with slotted beam of light from light source. On each side of hole 62 there have been provided the receiving tubes 56 (FIG. 6) which are so placed as to be directly over air nozzles 45 and 46 in order to receive the air jets which the nozzles supply.

The mounting of the complete densitometric testing unit 20 onto the conveyor frame assembly is done by bolts 63 through slotted holes 64 in angle iron 43, slotted holes providing a vertical positioning adjustment of unit 20. Also to provide for minor repairs or service, i.e., changing of burned out light source 22, the testing apparatus can be swung out or away from the conveyor by pivoting on bolts 40, with a spring 65 having been provided to return the testing apparatus or maintain it in correct position for the testing of a metallized coating.

As the glass sheet 16 with a metallized edge 14 (FIG. 8) is carried by the conveyor into the testing apparatus the leading edge intercepts an air jet from entrance nozzle 45 which, as will be shown later, produces no change in the operation at this time. On further movement of the glass sheet 16 the leading edge of the sheet moves over cylinder 33 so that the sheet's metallized edge is directly under the access hole 62 in plate 59 and covers the light beam slot. On still further movement of the sheet it intercepts the air stream of exit nozzle 46 and, in manner shown before, opens its air switch 49. On the opening of both air switches appropriate circuits are provided for the test apparatus to function.

The amount of light which will be transmitted through the metallized coating will be dependent on the density of said coating, and likewise the amount of light presented to the photocell 61 will be dependent on the density of the metallized coating. Since a photocell produces a current flow which is proportional to the light incident upon the cell, photocell 61 will present to amplifier 66 an electric signal whose strength will vary inversely with the density of the metallized coating which intercepts the light beam going to said cell. Electronic amplifier 66 will increase the signal which it receives to a usable level, and the output of amplifier 66 will be fed into an ammeter 67. Suitable calibration of this meter will provide a means for visual determination of the density of the metallic coat.

However, since it isn't always convenient to have an operator reading a dial on a continuous production process, and also because the operator might fail to notice short runs of improper density, it is desirable to provide a signal light, or any other of a number of other types of electrical indicators, which will inform the operator when the metallized coating is either excessively or insufficiently dense. The result is effected by taking the output of amplifier 66 and feeding it into each of two electronic amplifiers 68 and 69 (high density and low density), the output of each of these amplifiers 68 and 69 being used to power high density relays 70 and low density relays 71, whose circuits and operation will be discussed later, but whose purpose it is to provide signal light 72 with electrical energy whenever a metallic coating being tested is too dense or insufficiently dense.

Figure 7:
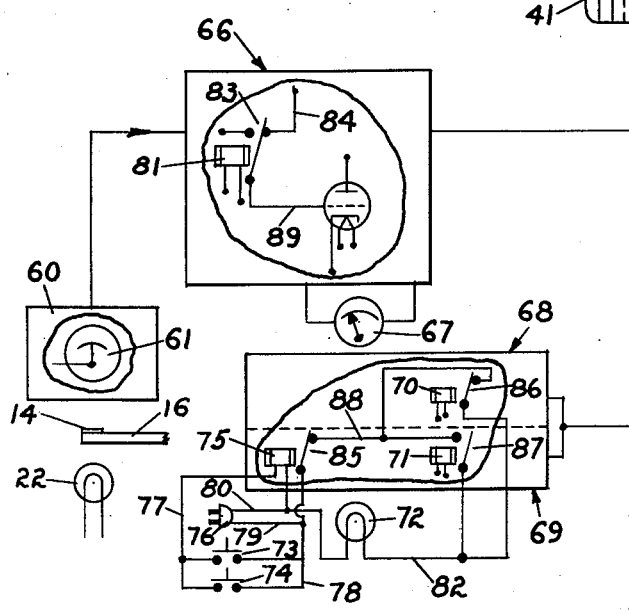
FIG. 7 is a diagrammatic sketch showing the various electrical units in block form and the essential signaling circuits diagram.

Reviewing the operation of the invention in greater detail, the first condition to consider is that where no test sample is in the apparatus. With electrical power applied to amplifiers 66, 68, 69, and light source 22, and also with a source of compressed air connected to tube 47 the testing apparatus is now in condition to receive samples for examination. The compressed air from receiving nozzles 45 and 46 enters orifices 55, is forced through tubes 57 into air switches 48 and 49, which on being actuated cause switch points 73 and 74 to close (FIG. 7). Closing of these air switch points completes the circuit from one side of relay 75 to one side of voltage source 76 by means of wire 77, switch points 73 and 74 (now closed), wire 78, and 79. The other side of relay 75 is connected directly to the remaining side of voltage source 76 by means of wire 80. Relay 75, and relay 81 which is wired in parallel with relay 75 (not shown) are now energized. The energizing of relay 75 opens up its normally closed contact point 85 thus making it impossible for signal light 72 to reach the one side of voltage source 76 by wire 82, and thus signal light 72 can not be lighted at this stage of the operation and give a false indication.

Energizing of relay 81 and the consequent shifting of point 83 disconnects signal coming from photocell 61 on wire 84 and places a signal of sufficient magnitude (obtained within the amplifier, not shown) which on being amplified through amplifier 66 will cause ammeter 67 to read about mid-scale. The purpose of this is to prevent the "pinning" of ammeter 67 by isolating the excessively strong signal at one of the amplifying stages of amplifier 66, as shown by the triode vacuum tube and its connections in FIG. 7, which is applied to amplifier 66 by photocell at this time, since there is nothing to obstruct the light flow from light source 22 to said photocell.

As the glass with the metallized edge to be tested is carried along by the conveyor, said sheet being positioned on the conveyor as shown in FIG. 8, the leading edge of the glass sheet first intercepts the air stream or jet from the entrance nozzle 45. On the obstructing of this air jet, and its corresponding air switch 49 having been relieved of the excess air pressure in space 55, contact point 73 opens up. However, as can be seen in FIG. 7 no electrical change will be effected by the opening of point 73 since it is shorted by point 74 which is still closed. The glass continuing on intercepts the light beam from light source 22 which is brought to a focus on the slotted diaphragm 34 by lens 35. Since relay 81 is still energized its point 83 prevents a signal which is being supplied to amplifier 66 by photocell 61, and which in one stage of its amplification is on wire 84, to continue through amplifier 66. Therefore, no reading or measuring will take place at this time. Still continuing onward the sheet intercepts exit nozzle 46 which opens its corresponding air switch point 74. Opening of point 74 deenergizes relay 75 by opening the path to electrical power source 76 from wire 77 of the relay 75. Deenergizing of relay 75 allows point 85 to assume its normally closed condition and electrical energy is available to relay points 86 and 87 by wire 88 and thus to signal light 72 depending on condition of said relay points, with the other side of signal light 72 connected to remaining side of power source directly by wire 80. Also with deenergizing of relay 75, the power to relay 81 in amplifier 66 will be removed because the two relay coils are wired in parallel. Deenergizing of relay 81 allows point 83 to assume the position shorting wire 84 to wire 89.

Effectively, the closing of both air switches 73 and 74 has placed the testing apparatus in an electrical state in which the measuring of densities can be begun. This feature of necessitating the closing of both air switch points 73 and 74 before testing can begin, is done to insure that the corners of glass sheets won't be tested. This was felt necessary because in the particular use involved the four edges are metallized and there is an overlapping of metallizing at the corners. Of course the overlapped corners would signal this to the operator. Such repetitive error signaling would defeat the purpose of the test apparatus. However, it must be remembered that this incorporated feature, although an integral part of the preferred embodiment, is not meant to preclude the use of other ways of controlling the equipment's operation, i.e., time delay circuits, etc.

After the glass sheet 16 has intercepted the light beam and both air switches, the density-measuring operation begins. It will be necessary to discuss the operation for the conditions where a coating is too dense, not dense enough, and has a normal density, in order to give a complete presentation of the pertinent information concerning the circuits and their operation.

If the metallic coating on the glass sheet, which is now positioned directly between the light beam from light source 22 and the access hole 62 to photocell 61, has less density than is considered to be sufficient by tests previously run, a greater amount of light will pass through the metallic coating and impinge on the cathode of the photocell 61, than would if the coating were within the acceptable range of density. This greater amount of light presents a greater amount of photoelectric current, or signal, to the input of amplifier 66. The output of amplifier 66, as read on the calibrated ammeter 67, is thus read as a low density. Similarly on the output of amplifier 66 being injected into the high density amplifier 68 and the low density amplifier 69, since these amplifiers have been so designed, their outputs will be sufficiently high to energize the high density relay 70 and low density relay 71. The energizing of these relays causes relay point 86 to open and relay point 87 to close. Closing of the latter point provides an electrical path from signal light 72 via wire 82, relay point 87, wire 88, relay point 85 (now closed), and wires 78 and 79 to one side of the voltage source 76. The other side of signal light 72 is connected directly to the other side of voltage source 76 by means of wire 80, and thus with signal light 72 connected to the voltage source 76 it will light. If the metallic coating intercepting the light beam is more dense than it is considered it should be, less light will be transmitted through the coating to the photocell 61 and thus a smaller photoelectric current will be presented to the amplifier 66. With a smaller signal presented to amplifier 66 the output as read on ammeter 67 will be shown as a density higher than the range calibrated as normal, the input to amplifiers 68 and 69 will be lower, and the output of both the high density amplifier 68 and low density amplifier 69 will be too low to energize either high density relay 70 or low density relay 71. Therefore relay point 87 will now be in an open position and relay point 86 will be in a closed position. With relay point 86 in a closed position there will be presented to signal light 72 a path to one side of the voltage source through wire 82, 85, relay point 86 (now closed), wire 88, relay point 85 (still closed), and wires 78 and 79 with the other side of the line still being connected directly by wire 80 to said light. Therefore, it can be concluded that whenever the density of the metallic coating on the glass sheets is not within the accepted range signal light 72 will be energized, and remain so, until either the density returns to the normal range or the glass sheet is removed from the test apparatus entirely.

If the density of the coating is within the acceptable range, low density amplifier 69 will not have an output great enough to energize low density relay 71 since amplifier 69, which has been designed and adjusted to require a signal strength at least as great as one corresponding to the minimum acceptable density, is receiving an insufficient signal because of the reduced quantity of transmitted light. On the other hand high density amplifier 68, since it has been designed and adjusted to produce sufficient output for energizing relay 70 with a signal input corresponding to the maximum allowable density, is receiving more than enough signal to energize relay 70. Energizing relay 70 and deenergizing relay 71 places both points 86 and 87 in an open condition and signal light 72 is deprived of an electrical path to the voltage source 56 on its wire 82 side, and thus doesn't light.

On still further movement of the sheet 16 the trailing edge of said sheet will pass beyond the entrance nozzle 45 thus allowing air switch point 73 to be closed. On the closing of point 73, relays 75 and 81 are again energized (as shown previously) and with the consequent opening of point 85 and the shifting of point 83 the testing apparatus is returned to the electrical state it was in before the sheet entered the testing area.

It is to be understood that the form of the invention herewith shown and described is to be taken as a preferred embodiment of the same, but that various changes in the shape, size and arrangement of parts may be resorted to without departing from the spirit of the invention or the scope of the sub-joined claims. In particular, the method of converting a transmitted light beam into an electrical signal by means of a photoelectric cell was used in the invention. However, it is to be understood that this use is not intended to preclude the use of other photoelectric type cells, such as photoconductive or photovoltaic cells, with of course corresponding changes in the associated amplifiers being made necessary. It was felt that although these latter types of cells effect changes in different parameters, i.e., electrical resistance and voltage, than the photocell the operation is sufficiently like that of the photoelectric cell used as to consider their use as being the same in principle.

I claim:

1. An apparatus for measuring the density of metal coatings on glass sheets and for simultaneously comparing the measured density against a predetermined standard range of acceptable density, including means supporting a plurality of individually and independently spaced glass sheets for movement along a predetermined path, a light source to impinge a beam of light onto only the portion of each glass sheet having a metal coating, means operable in response to the light modified by said coating to initiate an electrical pulse indicative of the density of that portion of the metal coating exposed to said light, signaling means responsive to the electrical pulse to convert said electrical pulse into a visual signal indicative of the coating density and means to synchronize the operation, said signaling means and said electrical pulse initiating means with the movement of the glass sheets along the definite path, said synchronizing means activating said signaling means and said electrical pulse initiating means.

2. An apparatus for measuring the density of metal coatings on glass sheets and for simultaneously comparing the measured density against a predetermined standard range of acceptable density, including means supporting a plurality of individually and independently spaced glass sheets for movement along a predetermined path, a light source to impinge a beam of light along a straight line and onto only the portion of each glass sheet having a metal coating, means operable in response to the light modified by said coating to initiate an electrical pulse indicative of the density of that portion of the metal coating in the line of light impingement, signaling means responsive to the electrical pulse to convert said electrical pulse into a visual signal indicative of the coating density, means to synchronize the operation of said signaling means and said electrical pulse initiating means with said glass sheet supporting means, said synchronizing means including air operated switching means positioned adjacent the path of travel of said glass sheets and connected to a source of compressed air, said switching means including first means and second means, both continuously emitting a stream of air, positioned one on each side of said light source whereby the stream of air from said first means will intercept each glass sheet moving along the predetermined path before said glass sheet reaches a point opposite to the line of light impingement and the stream of air from said second means will intercept each glass sheet only after said glass sheet has been conveyed past the point opposite to the line of light impingement.

3. An apparatus for measuring the density of metal coatings on glass sheets and for simultaneously comparing the measured density against a predetermined standard range of acceptable density, including means supporting a plurality of individually and independently spaced glass sheets for movement along a predetermined path, a light source to impinge a beam of light along a straight line and onto only the portion of each glass sheet having a metal coating means operable in response to the light modified by said coating to initiate an electrical pulse indicative of the density of that portion of the metal coating exposed to said light, signaling means responsive to the electrical pulse to convert said electrical pulse into a visual signal indicative of the coating density, means to synchronize the operation of said signaling means and said electrical pulse initiating means with said glass sheet supporting means, said synchronizing means including air operated switching means positioned adjacent the path of travel of said glass sheets and connected to a source of compressed air, said switching means including first means and second means, both continuously emitting a stream of air, positioned one on each side of said light source whereby the stream of air from said first means will intercept each glass sheet moving along the predetermined path before said glass sheet reaches a point opposite to the line of light impingement and the stream of air from said second means will intercept each glass sheet only after said glass sheet has been conveyed past the point opposite to the line of light impingement and means connecting said signaling means to said electrical pulse initiating means so that said signaling means are operable only when the density of the metal coating being measured is outside the predetermined standard range.

4. An apparatus for measuring the density of metal coatings on glass sheets and for simultaneously comparing the measured density against a predetermined standard range of acceptable density, including means supporting a plurality of individually and independently spaced glass sheets for movement along a predetermined path, a light source to impinge a beam of light along a straight line and onto only the portion of each glass sheet having a metal coating, means operable in response to the light modified by said coating to initiate an electrical pulse indicative of the density of that portion of the metal coating exposed to said light, signaling means responsive to the electrical pulse to convert said electrical pulse into a visual signal indicative of the coating density, means to synchronize the operation of said signaling means and said electrical pulse initiating means with said glass sheet supporting means, said synchronizing means including air operated switching means positioned adjacent the path of travel of said glass sheets and connected to a source of compressed air, said switching means including first means and second means, both continuously emitting a stream of air, positioned one on each side of said light source whereby the stream of air from said first means will intercept each glass sheet moving along a predetermined path before said glass sheet reaches a point opposite to the line of light impingement and the stream of air from said second means will intercept each glass sheet only after said glass sheet has been conveyed past the point opposite to the line of light impingement and amplifying means to increase the strength of the electrical pulse, said synchronizing means including means for disconnecting said means initiating said electrical pulse from its source of power when a glass sheet is not in position to be measured.

5. An apparatus for measuring the density of metal coatings on glass sheets and for simultaneously comparing the measured density against a predetermined standard range of acceptable density, including means supporting a plurality of individually and independently spaced glass sheets for movement along a predetermined path, a light source to impinge a beam of light along a straight line and onto only the portion of each glass sheet having a metal coating means operable in response to the light modified by said coating to initiate an electrical pulse indicative of the density of that portion of the metal coating exposed to said light, signaling means responsive to the electrical pulse to convert said electrical pulse into a visual signal indicative of the coating density, means to synchronize the operation of said signaling means and said electrical pulse initiating means with said glass sheet supporting means, said synchronizing means including air operated switching means positioned adjacent the path of travel of said glass sheets and connected to a source of compressed air, said switching means including first means and second means, both continuously emitting a stream of air, positioned one on each side of said light source whereby the stream of air from said first means will intercept each glass sheet moving along a predetermined path before said glass sheet reaches a point opposite to the line of light impingement and the stream of air from said second means will intercept each glass sheet only after said glass sheet has been conveyed past the point opposite to the line of light impingement and amplifying means to increase the strength of the electrical pulse, said amplifying means including a first amplifier, a normally open relay connected to said first amplifier adapted to be closed when the density of said coating is below a definite range, a second amplifier adapted to open when the density of said coating is less than the definite range, said relays being connected in parallel and when either is closed providing a circuit for operating said signaling means, and both relays being open when said coating is within said definite range.

6. In a method of measuring the density of selected portions of metal coatings along at least one margin of a plurality of individually and independently spaced glass sheets moving along a predetermined path, the coated margin being parallel to the direction of movement of the glass sheets, the steps of directing a beam of light from one side of said path transversely across the path to pass through said coated margin and impinge upon means operable in response to the beam as modified by the coating to initiate an electrical pulse indicative of the density of the metal coating exposed to the light, passing said pulse through a circuit connecting said pulse initiating means to a visual signaling means actuated by said pulse, directing a stream of fluid from one side of the path transversely across the path on opposite sides of said beam and along lines extending substanitally parallel to the beam, said streams when not interrupted by a sheet moving along said path being received in orifices and directed to air switches operable when actuated by the air streams to open the circuit between the pulse initiating means and the visual signaling means.

7. In a method of measuring the density of selected portions of metal coatings along at least one margin of a plurality of individually and independently spaced glass sheets moving along a predetermined path, said glass sheets being provided with the metal coatings on a plurality of margins which overlap at the corners of the glass sheets, the coated margin to be measured being parallel to the direction of movement of the glass sheets and the area of overlapping corners of said coating being excluded from the area of the coated margin being measured, the steps of directing a beam of light from one side of said path across the path to pass through said coated margin and impinge upon means operable in response to the beam as modified by the coating to initiate an electrical pulse indicative of the density of the coating exposed to the light, and passing said pulse through a circuit connecting said pulse initiating means to a density measuring device operable when actuated by said pulse to compare said indicated density with a predetermined range of the standard density and to produce a visual signal when said density is above or below said predetermined range, directing a stream of fluid from one side of the path transversely across the path along lines disposed at opposite sides of said beam and extending substantially parallel to the beams, actuating the measuring device to produce the visual signal only when both of the fluid streams are interrupted by a sheet moving along the path, whereby only the density of those portions of the coating intermediate the overlapping portions are measured.

8. In a method of measuring the density of a selected portion of metal coatings along at least one margin of a plurality of individually and independently spaced glass sheets moving along a predetermined path, the coated margin being parallel to the direction of movement of the glass sheets, the steps of directing a beam of light along a straight line extending transversely of said path and passing through said glass sheets and said metal coating, initiating an electrical pulse indicative of the density of the coating in response to said light beam passing through said sheet and coating thereon, passing said electrical pulse into a first amplifying means connected to a visual indicating means and operable to actuate said visual indicating means when the output of said first amplifying means is less than a first preselected value, passing said pulse in a second amplifying means connected to said visual indicating means and operable to actuate said visual indicating means when the output of said second amplifying means is greater than a second preselected value, said first preselected value being greater than said second preselected value whereby said first and second preselected values respectively indicate the maximum and minimum acceptable densities of the metal coating being measured, said first and second amplifying means being so designed that when the output of said first amplifying means is greater than said first preselected value and simultaneously the output of said second amplifying means is less than said second preselected value said visual indicating means will not be actuated, directing streams of fluid transversely across said path and along lines disposed on opposite sides of said beam, said streams when not interrupted by a sheet passing along said path being operable together to actuate switches to prevent the passage of said pulse into said first and second amplifying means whereby said visual indicating means is actuated only when said light beam passes through said selected portion of said coating.

References Cited in the file of this patent

UNITED STATES PATENTS

| | | |
|---|---|---|
| 1,882,962 | Sawford | Oct. 18, 1932 |
| 2,044,131 | Staege | June 16, 1936 |
| 2,287,808 | Lehde | June 30, 1942 |
| 2,394,129 | West | Feb. 5, 1946 |
| 2,428,796 | Friedman | Oct. 14, 1947 |
| 2,547,545 | Strong | Apr. 3, 1951 |
| 2,549,402 | Vossberg | Apr. 17, 1951 |
| 2,773,412 | Huck | Dec. 11, 1956 |

OTHER REFERENCES

"Density Control in the Manufacture of Rhodium Filters," Vacuum, vol. 1, 1951, pages 38, 39, Zehden.

"Measurement and Control of the Thickness of Thin Films," Vacuum, vol. II, 1952, pages 216–230, Greenland.